June 18, 1957 — P. C. KOENIG — 2,795,989
BLIND RIVET HAVING SEALING AND PIN RETAINING SLEEVE
Filed Aug. 28, 1953 — 2 Sheets-Sheet 1

INVENTOR.
PHILIP C. KOENIG
BY
Reynolds, Beach & Christensen
ATTORNEYS

INVENTOR.
PHILIP C. KOENIG
BY
ATTORNEYS

United States Patent Office 2,795,989
Patented June 18, 1957

2,795,989

BLIND RIVET HAVING SEALING AND PIN RETAINING SLEEVE

Philip C. Koenig, Seattle, Wash., assignor to Boeing Airplane Company, Seattle, Wash., a corporation of Delaware Application August 28, 1953, Serial No. 377,141

3 Claims. (Cl. 85—40)

This invention relates to an improved fastener device of the type which may be installed by operations conducted entirely from one side of the riveted structure being formed. Devices of this character are often referred to as "blind rivets." The present invention is herein illustratively described by reference to its presently preferred form as applied to fabrication of sheet metal structures in aircraft manufacture, but it should be understood that certain modifications and changes therein may be made without departing from the essential or characterizing features of the invention.

Being directed primarily to the requirements of particular importance in aircraft manufacture, the improved fastener device herein disclosed is compact, light in weight and possesses a relatively high shear strength.

Another object is the provision of a blind rivet clinching the overlapping parts firmly together as a step necessary to completion of the installation. Tightness of the riveted joint preventing passage of fluids and relative motion of the parts is also promoted by causing the body or shank of the rivet shell to expand and fill out the aligned holes in the overlapping parts as a definite step in the installation procedure. A specific object is to effect clinching of the overlapping parts tightly together before such expansion is effected, whereby the latter action will not tend to force material of the rivet shell body into the interface between such parts during its expansion and thus form a gap between such parts.

Additional objects include a low cost blind rivet which is relatively simple to manufacture and which may be installed quickly and easily.

Described in brief terms, the improved fastener device comprises three main elements, a central pin of progressively stepped diameter, a headed shell with an expansible body portion encircling such pin, and an expansible outer sleeve likewise encircling the pin. Initially the shell and the sleeve in unexpanded condition are slipped into place on an elongated relatively small-diameter portion of the pin. The assembled elements have a maximum diameter permitting their insertion through the aligned rivet holes in the overlapping structural parts to be riveted together. The larger end of the pin passes through the hole first, followed by the sleeve and next by the body of the shell. The head of the shell is thereby seated against one rim of the aligned rivet holes with the small portion of the pin projecting through such head to be grasped by a suitable retracting tool. The opposite end of the shell body then projects through and beyond the holes in the overlapping parts, with the expansible sleeve located beyond the projecting end of the shell, and the enlarged end of the pin located beyond the sleeve.

By reaction from the head of the shell, the projecting small end portion of the pin engaged by the retracting tool is drawn progressively back through the aligned shell and sleeve. Because of abutting shoulders thereon, the sleeve moves initially with the pin. The first increment of such pin retraction movement draws one end of the sleeve over the projecting end of the shell, the shell and sleeve being complementally formed to effect the necessary expansion of the sleeve for this purpose. The sleeve is thus expanded and slipped progressively over the projecting end of the shell body until it abuts the rim of the rivet hole and clinches the overlapping structural parts firmly together against the back side of the rivet head. Formation of the three fastener elements effecting that result as a preliminary step in the installation procedure represents an important feature of the invention.

In accordance with another feature of this invention further retraction movement of the pin effected by the retracting tool advances an enlarged intermediate portion of the pin through the initially smaller bore in the shell and thereby expands the shell into firm engagement with the surrounding sides of the aligned rivet holes. The sleeve portion surrounding the shell is also necessarily expanded by this action.

The final increment of pin retraction movement forces a further enlargement on the pin inside the projecting end of the shell and thereby forms a flare in the latter and also in the encircling sleeve preventing possible withdrawal of these fastener elements from the parts being fastened together. Such final retraction of the pin also effects an interlock between the outer or projecting end of the expansible sleeve and the enlarged end of the pin. By thus retaining the pin in the completed joint a high shear strength is achieved.

The projecting end portion of the pin gripped by the retracting tool may then be sheared off if desired flush with the shell head.

These and other features, objects and advantages of the invention including certain details of preferred embodiments thereof will become more fully evident from the following description by reference to the accompanying drawings.

Figure 1:
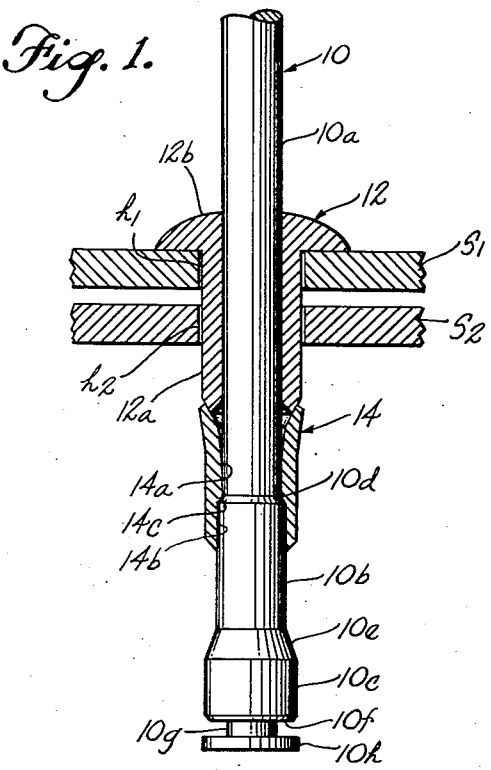
Figure 1 is a sectional side view of the improved fastener device with the elements thereof inserted in the aligned holes of overlapping parts to be joined together.
Figure 2:
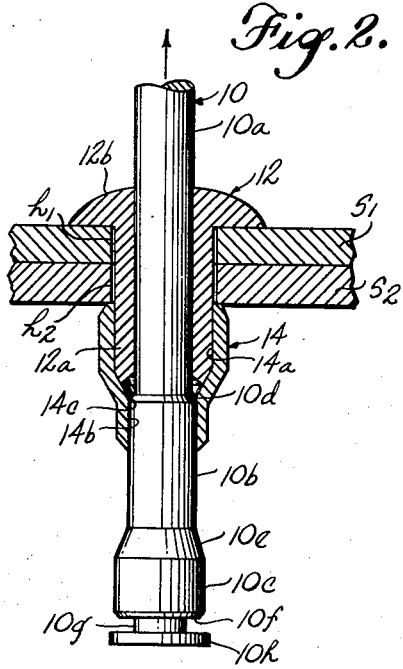
Figure 2 is a similar view in which the initial step of clinching the parts firmly together has been carried out.

Figures 5 through 8, inclusive, illustrate a modification, the successive views corresponding respectively to those illustrating the installation of the first embodiment.

As illustrated in Figures 1 to 4, inclusive, the improved fastener device may be utilized to secure together two overlapping sheet metal parts S1 and S2, provided with aligned fastener holes $h1$ and $h2$. The pin element 10 of the fastener device has an elongated portion 10a of relatively small diameter, a somewhat larger intermediate portion 10b, and an enlarged end portion 10c considerably larger in diameter than the intermediate portion. The portions 10a and 10b are joined by a relatively abrupt step or shoulder 10d, while the portions 10b and 10c are joined by a relatively gradual step 10e. Preferably the respective portions 10a, 10b and 10c are of substantially uniform diameter over substantially all or most of their length. The end of the enlarged portion 10c opposite the shoulder 10e is reduced abruptly in diameter to form an annular shoulder 10f, the edge of which is preferably chamfered as illustrated. A relatively short axial pin extension 10g of greatly reduced diameter projecting from the base of this annular shoulder terminates in the enlarged tip formation 10h of a diameter not materially exceeding that of the end portion 10c and forms an annular groove.

In the illustrated case the elongated portion 10a of the pin has a sufficient length to be grasped by a suitable retracting tool (not shown) when both the headed shell 12 and the expansible sleeve 14 are slipped on the pin in abutting positions for insertion through the aligned rivet holes h1 and h2. The respective lengths of the intermediate portion 10b and the enlarged end portion 10c are related to the longitudinal dimensions of the expansible sleeve 14 and the expansible headed shell 12, as will later more fully appear.

Initially the headed cylindrical shell 12 comprising the body portion 12a and the enlarged head 12b slips freely over the shank or elongated portion 10a of the pin. The fit between these two elements is a free sliding fit, although is no looser than necessary for that purpose. In the illustration the head of the shell 12 is convexly rounded, but it will be apreciated that a flat-headed shell or one adapted to be countersunk in the riveted parts as well as other forms may be adopted in lieu thereof. The length of the body portion 12a of the shell is sufficient that it will project well beyond the overlapping parts S1 and S2 when the shell head 12b is seated against one rim of the aligned rivet holes. The projecting end of the shell is double beveled or chamfered, as shown, for a reason which will appear.

The expansible sleeve 14 has a stepped internal bore one portion of which, 14a, is of a size to slide freely on the elongated portion 10a of the pin. The adjoining portion 14b of the sleeve bore is of a diameter to slide freely on the intermediate portion 10b of the pin. A relatively abrupt shoulder 14c is formed at the transition between these two adjoining portions of the sleeve bore, which shoulder initially abuts the shoulder 10d on the pin as illustrated in Figure 1. The shoulder 14c is located generally intermediate the ends of the sleeve, in the example being positioned about one-third the length of the sleeve from the lower end thereof as seen in the figure. The upper end of the sleeve initially abuts the lower end of the shell and its bore is flared at that end. The lower end of the shell seats just inside the rim of the sleeve, and due to the taper of their abutting surfaces the sleeve will be caused to expand and slip over the body portion of the shell when the two are forced together.

Application of force causing the sleeve to expand and slip over the shell is effected by means of a suitable tool for grasping the projecting end portion of the pin and drawing it back through the shell. Such tools are well known in the prior art and operate on the principle of a fixed jaw seated against the head of the rivet or shell 12 and a movable jaw with grippers capable of drawing the pin through the shell by reaction from the shell head. When the pin is retracted in this manner, it carries the sleeve with it by virtue of the abutment between the co-operating shoulders 10d and 14c on the pin and in the sleeve respectively. Such expansion and sliding of the sleeve over the projecting body portion of the shell 12 continues as in Figure 2 until the leading end of the sleeve firmly abuts the adjacent sheet metal part S1 so that the latter is pressed firmly against the cooperating part S2 bearing on the underside of the shell head 12b. In other words, after the assembled fastener elements have been inserted in the part holes as in Figure 1, initial retraction movement of the pin 10 relative to the shell 12 draws the sleeve 14 over the projecting shank of the shell and clinches the overlapping sheet metal parts tightly together.

Further retraction movement of the pin 10 relative to the headed shell 12, with the sheet metal parts S1 and S2 clinched and held firmly together as just described, forces the shoulder 10d on the pin past the cooperating shoulder 14c in the shell and brings the tapered shoulder 10d first to the beveled or chamfered entrance through the bore in the shell 12 and thereafter progressively advances the enlarged intermediate portion 10b of the pin through the sleeve bore. This causes the shell to swell or expand progressively along its length, since the diameter of the portion 10b of the pin somewhat exceeds the initial internal diameter of the shell. By a proper choice of these diameters relative to the diameter of the holes h1 and h2, this forced expansion of the shell presses its periphery against the inside walls of the holes and tightens the joint. Completion of this intermediate stage of retraction movement of the pin relative to the shell is nearly accomplished in the positional relationships shown in Figure 3.

Figure 3:
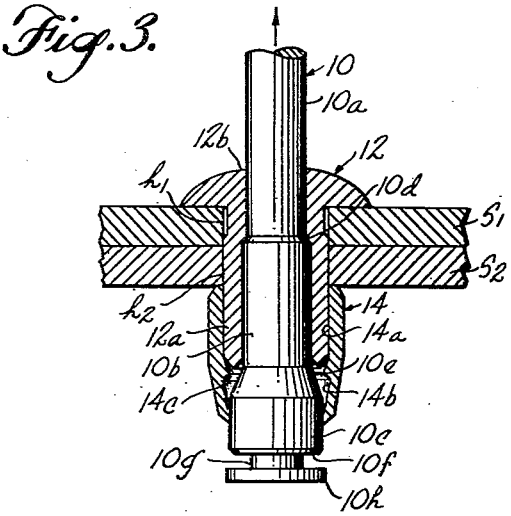
Figure 3 is a similar view in which the succeeding step of expanding the headed shell is being effected.

With reference to Figure 3 it will be noted that the step of expanding the headed shell in order to fill out the rivet holes h1 and h2, must be preceded by the step (illustrated in Figure 2) of clinching the sheet metal parts S1 and S2 firmly together. This definite sequence of operations, whereby the gap between the riveted parts is first closed insures that metal of the expanding shell will not be forced into the interface between the sheet metal parts and thus form a permanent gap between them.

Figure 4:
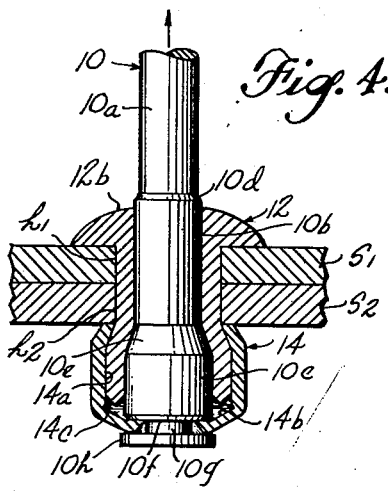
Figure 4 is a similar view in which the pin has reached its final position and the fastening is completed.

In Figure 4 the pin has been retracted the final distance necessary to complete the fastening. In the final phase of pin retraction movement the enlarged end portion 10c of the pin, preceded by the taper or step 10e is wedged or forced into the shell bore and causes both the shell and the sleeve surrounding it to flare out and produce an interlock preventing retraction of the shell through the rivet holes h1 and h2. As this is being accomplished the projecting end of the sleeve 14 sliding on the enlargement 10c is reached by the groove beyond the shoulder 10f and tends to contact slightly and drop into this groove. The end of the sleeve is then caught by the enlarged tip element 10h and is forced inwardly to a seat in the groove as the pin reaches its final position to form an interlock with the pin 10 permanently retaining such pin in the completed fastener device. Thus the pin not only serves as a sliding actuator but forms a part of the completed fastener and greatly augments its shear strength as well as maintaining the sleeve and shell in their finally molded forms establishing a tight connection between the sheets S1 and S2.

The length of pin 10 projecting beyond the head of the shell 12 may be sheared off by a suitable tool in order to present a smooth exterior surface flush with the shell head.

In the modified embodiment appearing in Figures 5 to 8, inclusive, final interlock between the expansible sleeve and the enlarged end of the retractable pin is achieved in a different manner than in the preceding form. In the second form the expansible sleeve 14' is formed of an elastic material such as Du Pont Nylon Type No. FM–10,001, a relatively hard and tough plastic. Other similar plastic materials of a tough elastic nature may also be used for this sleeve. As illustrated the initial shape and size of the sleeve 14' may be similar to the corresponding sleeve 14 in the preceding form, and for convenience corresponding parts thereof are labeled with similar numbers bearing the prime notation.

The headed shell 12' is preferably of a form similar to the shell in the preceding embodiment except it is somewhat shorter in relation to the combined thickness of the overlapping structural parts S1 and S2. This change of length has been made for the purpose of showing that the length of the shell body is not critical, if it projects a short but appreciable distance beyond the interconnected parts so as to permit it to be expanded and thereby form an interlock preventing its dislodgment from the rivet holes.

The stepped pin 10' likewise may have a similar shape and similar dimensions relative to the cooperating elements of the fastener device as in the preceding form, including the elongated portion 10a', the somewhat larger intermediate portion 10b' and the enlarged end portion 10c, with the transitional steps 10d' and 10e', respectively. However, the lower extremity of the pin adjacent the enlarged portion 10c' is of somewhat modified form in this second embodiment in order for it to cooperate to best advantage with the modified type of expansible sleeve 14'. In the present instance the lower extremity of the pin terminates in a sloping shoulder 10f', the abruptness of which may vary considerably without impairing the interlock achieved.

Figure 5:
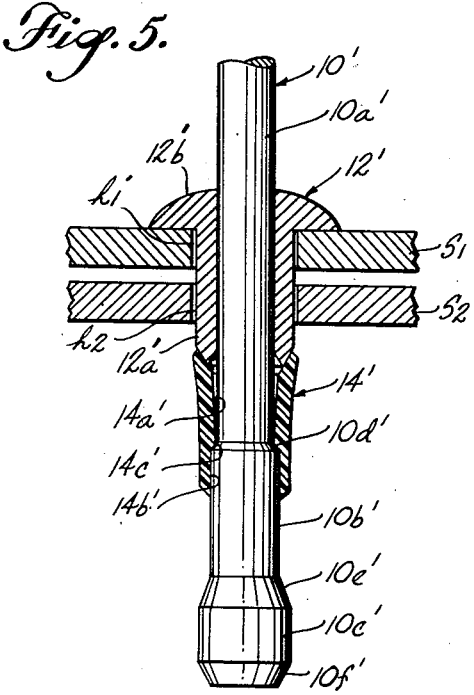
Figure 6:
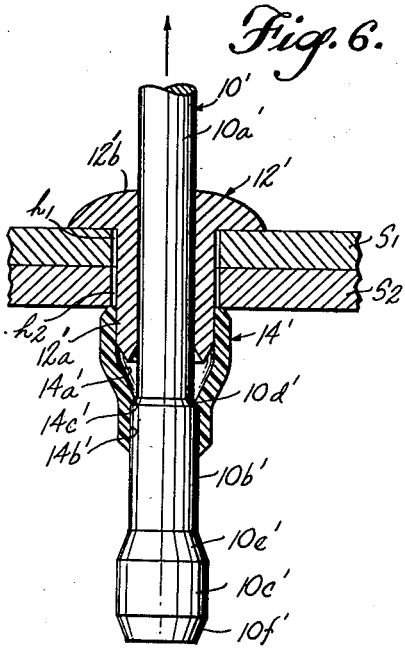
Figure 7:
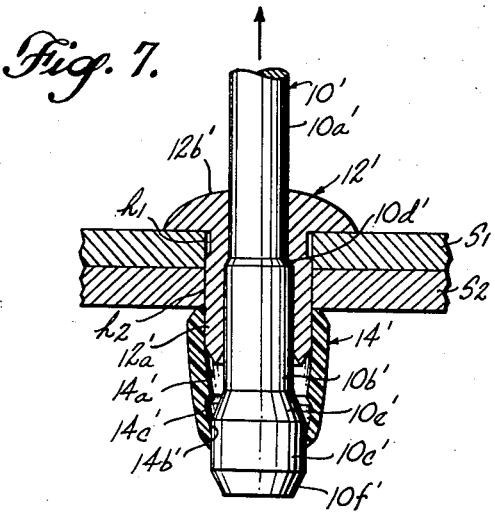
Figure 8:
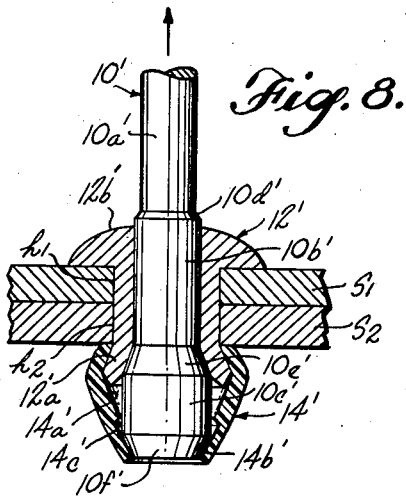

As shown in Figures 5, 6 and 7, the cooperative action of the pin, the sleeve and the shell by which the overlapping structural parts S1 and S2 are first clinched together followed by expansion of the shell during continuing retraction movement of the pin relative thereto takes place as in the preceding form. In the final phase of pin retraction movement, however, effecting expansion of the projecting end of the shell to lock the same in place the inherent resilience and elasticity of the sleeve 14' causes it to contract tightly around the beveled shoulder 10f' at the lower extremity of the pin, and thereby form the interlock for retaining the pin in the completed fastener device. In the first embodiment the sleeve material was assumed to be of a ductile or malleable nature requiring positive force to press the end of the sleeve into the groove defined between the shoulder 10f and the tip element 10h, whereas in the present instance the tip element is eliminated by relying upon the elastic contraction of the sleeve pressing against the end shoulder 10f' on the pin and preventing the latter from dropping out of the shell.

Another advantage of employing a deformable elastic sleeve 14' of the type described is the better surface contact it established with the rim of the rivet hole in the part S2 and also with the annular surfaces of the pin, tending to seal the joint against any passage of fluid therethrough.

Having described the invention by reference to its presently preferred embodiments, it is desired to point out that a nlmber of specific modifications may be devised without departing from the essential features involved, as set forth in the appended claims.

I claim as my invention:

1. A fastener device adapted to secure work pieces together, comprising a central pin of stepped diameter having an end portion of relatively large diameter, an intermediate portion of lesser diameter and an elongated opposite end portion of relatively small diameter, said first end portion being joined to said intermediate portion through a relatively gradually tapered first step and said intermediate portion being joined to said opposite end portion through a second step, an expansible sleeve encircling said pin and having at least a portion of its length of an internal diameter slightly larger than that of said small end portion of the pin, said sleeve having a shoulder thereon intially abutted to said second step on said pin by insertion of the pin into said sleeve, and a headed shell slidably closely encircling said small end portion of the pin with the latter projecting beyond the head thereof for engagement by a fastener installing tool, said shell having an internal diameter smaller than the intermediate pin portion diameter and comprising a body portion of predetermined external diameter adapted to slip into a retaining hole for the fastener device, and a head adapted to seat against one rim of such retaining hole, said shell body portion having an end initially abutted to one end of said sleeve, at least one of said abutting ends having a tapered surface diverging toward said head to wedge past the other such end, the total length of the sleeve being greater than the combined lengths of the first step and the large end portion of the pin whereby initial withdrawal movement of the pin in relation to the shell abuts the sleeve against the work, further such withdrawal movement expands the shell body in the work and in the sleeve and thereby expands the portion of the sleeve overlapped by the shell, and final such withdrawal movement forces said first step and said enlarged end of the pin into the end of the shell body portion opposite the shell head, thereby to further expand said sleeve and said body portion end, the latter being adapted thereby to assume substantially the taper of said first step, and the sleeve adjacent the work being adapted thereby to assume substantially the same taper at least over an end portion thereof adjacent the work, said pin enlarged diameter end portion having a shoulder formed by a reduction of diameter, directed away from the small diameter portion of such pin, whereby said sleeve end portion opposite from the work is adapted to contract against said shoulder by said final pin movement, thereby to retain the pin in said sleeve and shell, with the external diameters of the body portion, sleeve and largest end portion of the pin being substantially the same initially.

2. The fastener device defined in claim 1, wherein the sleeve is formed of elastic material which inherently contracts around the pin's shoulder by the pin's final movement, thereby retaining said pin against dislodgment from the shell.

3. The fastener device defined in claim 1, wherein the pin further comprises a tip portion formed on the extremity of the first-mentioned end portion of such pin, said tip portion including an enlargement of greater outside cross-sectional dimension than the inside dimension of the corresponding end of the sleeve, such enlargement being separated from the first-mentioned end portion of the pin by a groove extending therearound, thereby forming the shoulder on the pin, said tip portion enlargement being adapted to catch and deflect said latter end of said sleeve inwardly into said groove hence to contract it against said shoulder by final movement of the pin relative to the shell, thereby retaining said pin against dislodgement from the expanded shell and encircling sleeve.

References Cited in the file of this patent

UNITED STATES PATENTS

| 2,061,629 | Huck | Nov. 24, 1936 |
| 2,652,741 | Ketchum | Sept. 22, 1953 |

FOREIGN PATENTS

| 436,238 | Great Britain | Oct. 8, 1935 |